United States Patent
Zhang et al.

(10) Patent No.: US 10,937,157 B2
(45) Date of Patent: Mar. 2, 2021

(54) COMPUTED TOMOGRAPHY PULMONARY NODULE DETECTION METHOD BASED ON DEEP LEARNING

(71) Applicant: Infervision Medical Technology Co., Ltd., Beijing (CN)

(72) Inventors: Rongguo Zhang, Beijing (CN); Mengmeng Sun, Beijing (CN); Shaokang Wang, Beijing (CN); Kuan Chen, Beijing (CN)

(73) Assignee: Infervision Medical Technology Co., Ltd., Beijing (CN)

( * ) Notice: Subject to any disclaimer, the term of this patent is extended or adjusted under 35 U.S.C. 154(b) by 41 days.

(21) Appl. No.: 16/351,896

(22) Filed: Mar. 13, 2019

(65) Prior Publication Data
US 2019/0287242 A1    Sep. 19, 2019

(30) Foreign Application Priority Data
Mar. 16, 2018  (CN) .......................... 201810217568.7

(51) Int. Cl.
*G06T 7/00*    (2017.01)
*G06N 20/00*    (2019.01)
(Continued)

(52) U.S. Cl.
CPC .............. *G06T 7/0012* (2013.01); *G06N 3/08* (2013.01); *G06N 20/00* (2019.01); *G06T 7/11* (2017.01);
(Continued)

(58) Field of Classification Search
CPC ..................... G06T 7/0012; G06T 7/11; G06T 2207/10081; G06T 2207/20081;
(Continued)

(56) References Cited

U.S. PATENT DOCUMENTS

2018/0240235 A1* 8/2018 Mazo .................... G06T 7/0012
2019/0370965 A1* 12/2019 Lay ......................... G06N 20/00

OTHER PUBLICATIONS

Fan et al., "Lung Nodule Detection Based on 3D Convolutional Neural Networks", 978-1-5386-3148-5/17/$31.00 © 2017 IEEE (Year: 2017).*

(Continued)

*Primary Examiner* — Qian Yang
(74) *Attorney, Agent, or Firm* — H.C. Park & Associates, PLC

(57) ABSTRACT

A computed tomography (CT) pulmonary nodule detection method based on deep learning is provided. The method comprises the steps of: acquiring 3D pulmonary CT sequence images of a user; processing the acquired 3D pulmonary CT sequence images into 2D image data; inputting 2D image data into a preset deep learning network model for training to obtain a trained pulmonary nodule detection model; inputting a set of 3D pulmonary CT sequence images to be tested into the trained pulmonary nodule detection model to obtain a preliminary pulmonary nodule detection result; applying a pulmonary region segmentation algorithm based on deep learning to the preliminary pulmonary nodule detection result to remove false positive pulmonary nodules, so as to obtain a final pulmonary nodule detection result.

9 Claims, 3 Drawing Sheets

(51) Int. Cl.
*G06N 3/08* (2006.01)
*G06T 7/11* (2017.01)

(52) U.S. Cl.
CPC .............. *G06T 2207/10081* (2013.01); *G06T 2207/20081* (2013.01); *G06T 2207/20084* (2013.01); *G06T 2207/30064* (2013.01)

(58) Field of Classification Search
CPC ........... G06T 2207/20084; G06T 2207/30064; G06N 20/00; G06N 3/08; G06K 9/4604; G06K 9/6256; G06K 9/6267; G06K 2209/053
See application file for complete search history.

(56) References Cited

OTHER PUBLICATIONS

Lin et al., "Reduction of False Positives in Lung Nodule Detection Using a Two-Level Neural Classification", IEEE Transactions on Medical Imaging, vol. 15, No. 2, Apr. 1996 (Year: 1996).*

* cited by examiner

COMPUTED TOMOGRAPHY PULMONARY NODULE DETECTION METHOD BASED ON DEEP LEARNING

CROSS REFERENCE TO RELATED APPLICATION

This application claims priority from and the benefit of Chinese Patent Application No. 201810217568.7, filed on Mar. 16, 2018, which is hereby incorporated by reference for all purposes as if fully set forth herein.

BACKGROUND

Field

Exemplary embodiments/implementations of the invention relate generally to the field of medical image processing, in particular to a Computed Tomography (CT) pulmonary nodule detection method based on deep learning.

Discussion of the Background

Pulmonary cancer is the kind of disease with the highest morbidity and mortality in China. The death rate of pulmonary cancer has increased by 465% in the past 30 years, the main reason of which is that 75% of cancer patients are diagnosed only by the intermediate and advanced stages. Even in developed countries, pulmonary cancer is the most common and fatal one of all malignant tumors. The detection rate of early pulmonary cancer is less than 25%, whereas the 5-year survival rate of early pulmonary cancer reaches 55%. Because its early characteristics are not obvious, the best way to detect pulmonary cancer is to screen pulmonary nodules regularly.

CT (Computed Tomography) is a reliable screening method often adopted. The number of CT images of a slice thickness of 1.25 mm is between 200 and 300. When dealing with the numerous CT images produced, the man power will be saved and missed diagnosis due to over-fatigue will be reduced if artificial intelligence technology is adopted to assist doctors with certain diagnosis.

Deep learning neural network model is inspired by the biological structure of human brain, but compared with human brain, hierarchy of deep learning neural network are clearer, connections of neuron units are more regular, and directions of signal transmission are more definitive. Since deep learning can describe images with very small feature units (in pixels), deep learning artificial intelligence can analyze and build models that are tens of thousands of times more complicated than traditional logic methods, and accomplish tasks such as image recognition and image classification more accurately. The most widely recognized application of deep learning is Google's Alpha Go, which overwhelmingly defeated world Go champions Lee Se-dol and Ke Jie in the man vs. machine competition. In addition to Go, deep learning has outperformed traditional methods in areas such as image recognition and voice recognition, and has brought great breakthroughs in various application scenarios, such as unmanned vehicles, voice recognition, face recognition and so on. Recently, artificial intelligence has also made breakthroughs in medical imaging research.

The use of deep learning technology makes it possible to reduce missed diagnosis and further enhance the value of CT in pulmonary cancer screening. Not only is deep learning of great clinical significance for accurate evaluation of lesions, but it also exhibits potential and brings hope in imaging evaluation.

The above information disclosed in this Background section is only for understanding of the background of the inventive concepts, and, therefore, it may contain information that does not constitute prior art.

SUMMARY

A CT pulmonary nodule detection method based on deep learning is provided, which comprises the steps of:

S1: acquiring three dimensional (3D) pulmonary CT sequence images of the user;

S2: processing the acquired 3D pulmonary CT sequence images into two dimensional (2D) image data;

S3: inputting the 2D image data into a preset deep learning network model for training, thus obtaining a trained pulmonary nodule detection model;

S4: inputting the tested 3D pulmonary CT sequence images into a trained pulmonary nodule detection model to obtain a preliminary pulmonary nodule detection results;

S5: applying a pulmonary region segmentation algorithm based on deep learning to the preliminary pulmonary nodule detection results to remove false positive pulmonary nodules, thus obtaining the final pulmonary nodule detection results.

Additional features of the inventive concepts will be set forth in the description which follows, and in part will be apparent from the description, or may be learned by practice of the inventive concepts.

Preferably, the S2 step further includes: for the acquired 3D pulmonary CT sequence images, with each slice containing pulmonary nodules as the center, n slices are taken before and n slices are taken after the centered slice, thus 2n+1 slices constitute 2D image data, where n is an integer greater than or equal to 1.

Preferably, in step S3, the preset deep learning network model includes multi-scale features, and the multi-scale features are applied in the training process.

Preferably, wherein the multi-scale features are constructed by fusing the response information of different slices of the deep learning network model.

Preferably, in step S4, before the tested 3D pulmonary CT sequence images are input into the trained pulmonary nodule detection model, the tested 3D pulmonary CT test sequence images are centered on one slice, n slices are taken before and n slices are taken after this one centered slice, thus 2n+1 slices constitute 2D image data, where n is an integer greater than or equal to 1.

Preferably, in step S5, according to the preset pulmonary region segmentation model, the preliminary pulmonary nodule detection results are segmented for the preliminary region to remove false positive pulmonary nodules.

Preferably, the preset deep learning network model is constructed and trained using 2D pulmonary region images to obtain a preset pulmonary region segmentation model.

The technical solution provided by the invention has the beneficial effects that the detection of pulmonary nodules can be realized, 3D information of CT sequence images are fully utilized, 3D information is fused into 2D deep learning network structure, and over-fitting and over-dependence on computing resources due to the application of 3D deep learning network are avoided.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
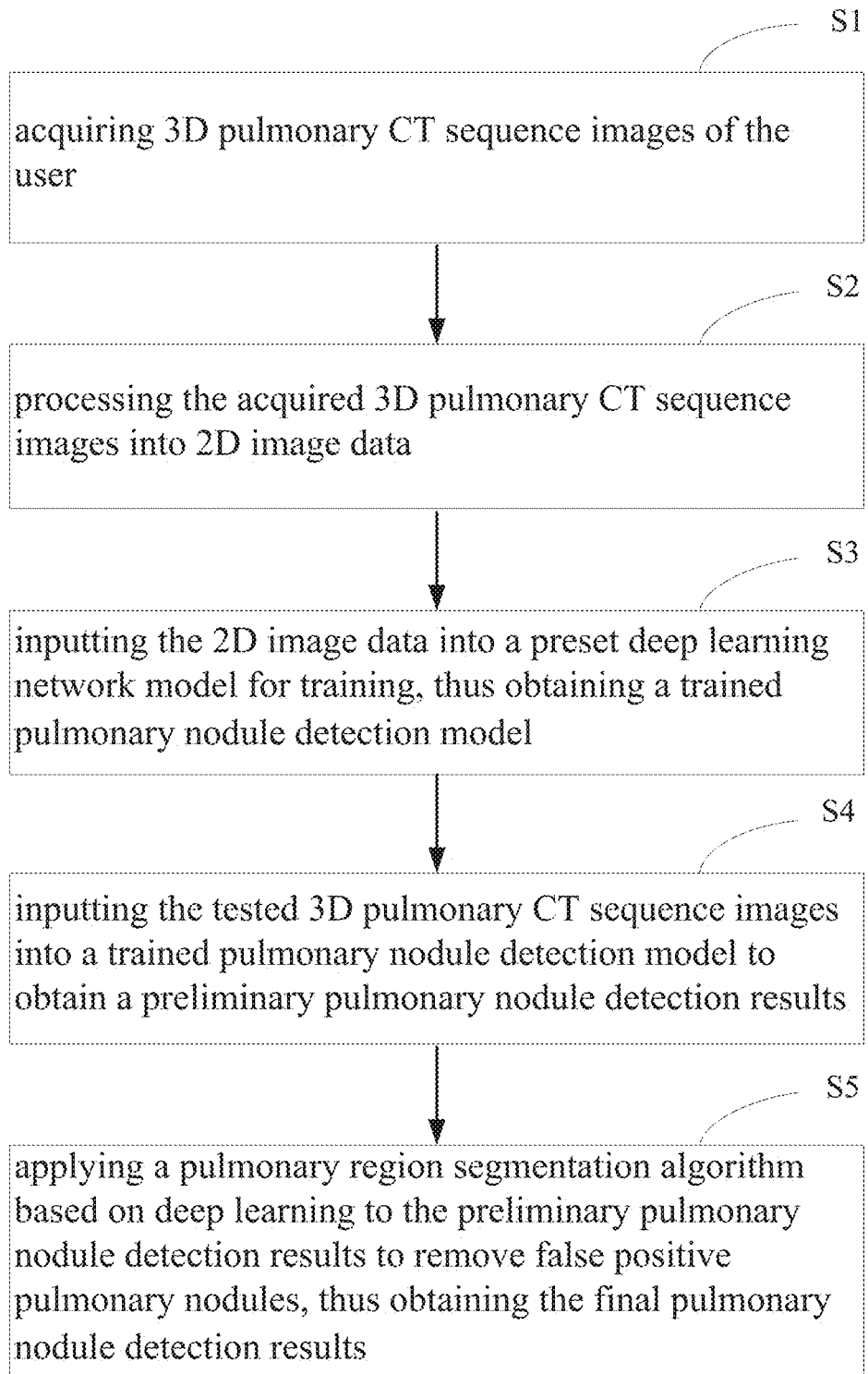
FIG. 1 is a flowchart of a CT pulmonary nodule detection method based on deep learning according to the present invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

In the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings may be performed by functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

The general inventive concept of the present invention is to process the pulmonary CT sequence images into 2n+1 2-Dimensional images and input them into the deep learning network, and customize the structure of the deep learning network structure, which can receive 2n+1 images as input and fuse multi-scale features; the detection model of pulmonary nodules is obtained by learning training samples, and the detection of pulmonary nodules is realized by using the model; finally, the extra-pulmonary false positive pulmonary nodules are removed by segmenting the pulmonary area, and the final detection results of pulmonary nodules are obtained.

FIG. 1 is a flowchart of a CT pulmonary nodule detection method based on deep learning according to the present invention.

In step S1, 3D pulmonary CT sequence images of the user are acquired;

In step S2, the acquired 3D pulmonary CT sequence images are processed into 2D image data;

In step S3, the 2D image data are input into a preset deep learning network model for training, thus a trained pulmonary nodule detection model is obtained;

In step S4, the tested 3D pulmonary CT sequence images are input into the trained pulmonary nodule detection model, thus preliminary pulmonary nodule detection results are obtained;

In step S5, a pulmonary region segmentation algorithm based on deep learning is applied to the preliminary pulmonary nodule detection results to remove false positive pulmonary nodules, thus the final pulmonary nodule detection results are obtained.

Figure 2:
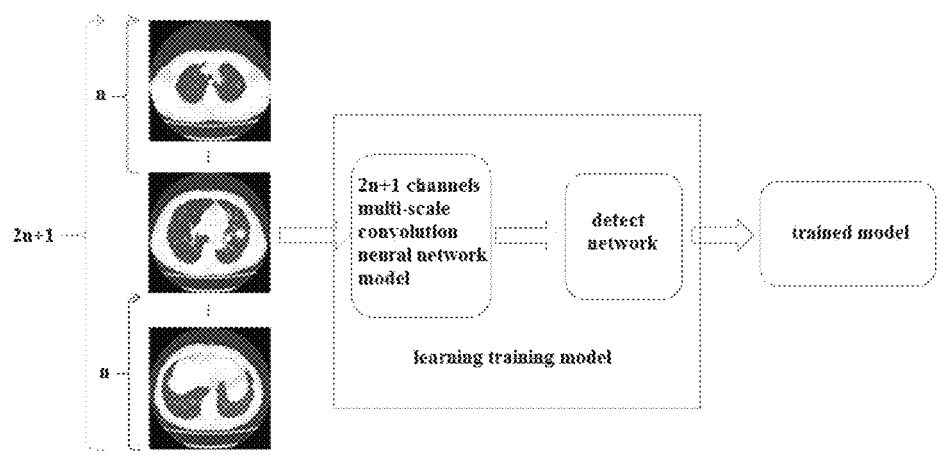
FIG. 2 is a schematic diagram of the training process of a CT pulmonary nodule detection method based on deep learning according to the present invention.

FIG. 2 is a schematic diagram of the training process of a CT pulmonary nodule detection method based on deep learning according to the present invention. In steps S1 and S2, the 3D pulmonary CT sequence images containing pulmonary nodules are collected first, with each slice containing pulmonary nodules as the center, n slices are taken before and after the centered slice, thereby a total of 2n+1 slices are collected and input as a training sample into a preset deep learning network model for training, where n is an integer greater than or equal to 1. The preset deep learning network model for training is a 2n+1 channels multi-scale region-based convolution neural network model, thus a trained pulmonary nodule detection model is obtained after undergoing multiple rounds of training. Therefore, in the present invention, the acquired 3D pulmonary CT sequence images are processed into 2D image data and 3D information are fused into 2D deep learning network structure, which not only making full use of the context information of the images, but also avoiding over-fitting and over-reliance on computing resources due to the application of 3D deep learning network.

Figure 3:
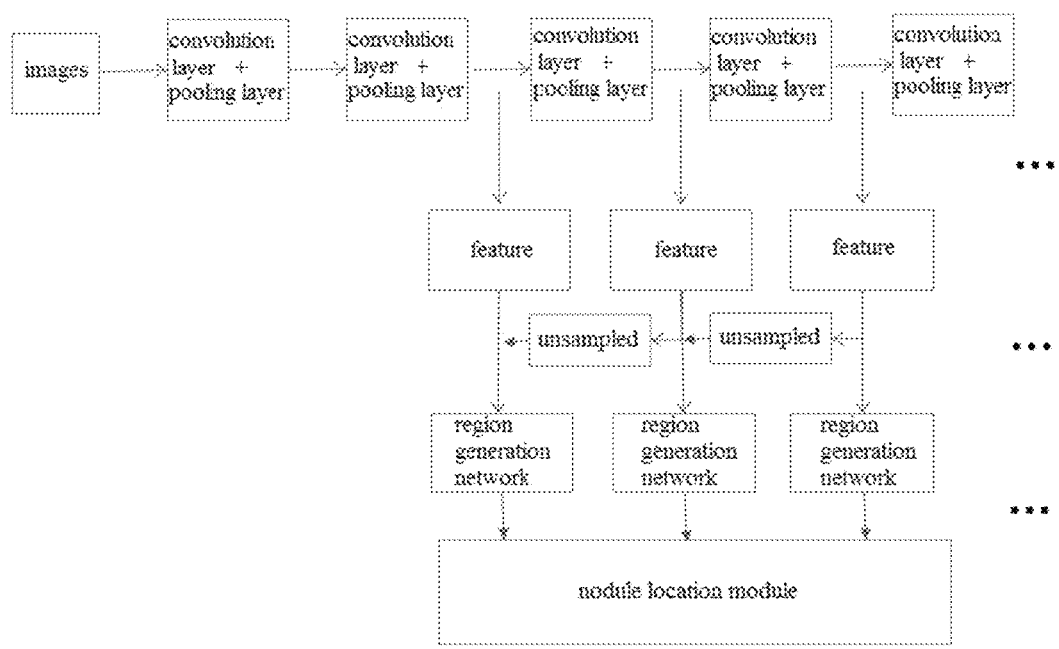
FIG. 3 is a structure diagram of a preset deep learning network model according to the present invention.

FIG. 3 is a structure diagram of a preset deep learning network model according to the present invention. Referring to FIG. 3, the deep learning network model performs multi-scale feature extraction on the input images. Specifically, a deeper feature map is obtained after the input image data going through the convolution layer. The pooling layer performs compression on the input feature map, which downsizes the feature map and reduces the network computing complexity, while performs feature compression to extract the main features, that is, each time the input image data go through a convolution layer and a pooling layer, there will be a corresponding feature map. The corresponding feature map is then upsampled. The region generation network can generate high-quality region suggestion boxes. The nodule location module is used for final classification and maps the obtained results into the type space of the input data.

Therefore, the deep learning network model of the present invention achieves fusion of multi-scale features by extracting candidate regions of pulmonary nodules at different feature levels, enriches the representation capability of features, facilitates training to obtain a better pulmonary nodule detection model, and realizes a pulmonary nodule detection model based on multi-scale features.

Figure 4:
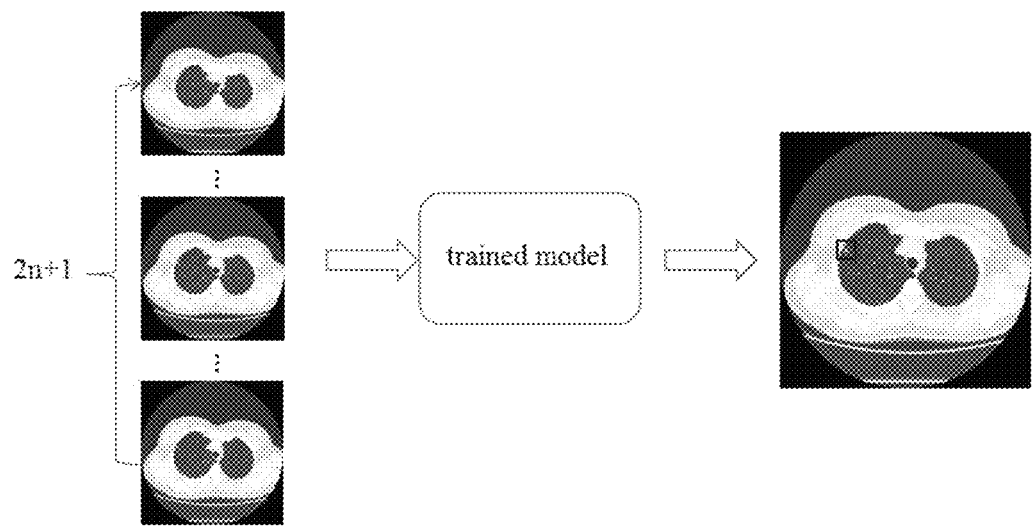
FIG. 4 is a schematic diagram of the test process of a CT pulmonary nodule detection method based on deep learning according to the present invention.

FIG. 4 is a schematic diagram of the test process of a CT pulmonary nodule detection method based on deep learning according to the present invention. Referring to FIG. 4, the tested CT data is tested using the trained pulmonary nodule detection model. Before the tested CT data are input into the trained pulmonary nodule detection model, the test data is centered on one slice, with n slices taken before and n slices after this one centered slice, where n is an integer greater than or equal to 1, i.e. the tested CT data are also processed into 2n+1 slices in sequence as an input sample, and then the preliminary pulmonary nodule detection results are obtained by calculation of the pulmonary nodule detection model.

Figure 5:
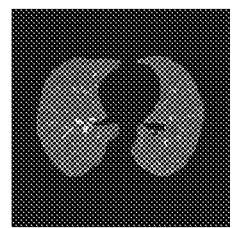
FIG. 5 is a schematic diagram of pulmonary nodule detection results of a CT pulmonary nodule detection method based on deep learning according to the present invention.

Referring to FIG. 5, a pulmonary region segmentation algorithm based on deep learning is applied to segment the pulmonary region, removing extra-pulmonary false positive pulmonary nodules in the detection results so that the final pulmonary nodule detection results are obtained. Firstly, a deep learning network model is constructed and trained with 3D pulmonary CT sequence images to obtain a pulmonary region segmentation model based on deep learning, and then the preliminary pulmonary nodule detection results are input into the trained pulmonary region segmentation model based on deep learning to obtain the final pulmonary nodule detection results. Therefore, the pulmonary region segmentation algorithm of the present invention can realize fine processing of pulmonary nodules by constructing a deep learning network model and performing training.

According to the CT pulmonary nodule detection method based on deep learning, the advantages of deep learning are utilized to directly learn the features of pulmonary nodules, and the CT pulmonary nodule detection method is more suitable for detecting pulmonary nodules under complex conditions; the invention can make full use of the 3D context information of pulmonary CT images and fuse 3D information into 2D deep learning network structure, thus avoiding over-fitting and over-reliance on computing resources due to the application of 3D deep learning network.

Specific embodiments of the present invention have been described above in detail, but it will be understood that modifications may be made thereto without departing from the spirit of the present invention. The claims of the present invention are intended to cover these modifications so as to ensure that they fall within the true scope and spirit of the present invention.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A computed tomography (CT) pulmonary nodule detection method based on deep learning, comprising the steps of:
   acquiring three dimensional (3D) pulmonary CT sequence images of a user;
   processing the acquired 3D pulmonary CT sequence images into multiple two dimensional (2D) image data;
   inputting the multiple 2D image data into a preset 2D deep learning network model for training, thus obtaining a trained pulmonary nodule detection model;
   inputting a set of 3D pulmonary CT sequence images to be tested into the trained pulmonary nodule detection model to obtain a preliminary pulmonary nodule detection result;
   applying a pulmonary region segmentation algorithm based on deep learning to the preliminary pulmonary nodule detection result to remove false positive pulmonary nodules, thus obtaining a final pulmonary nodule detection result;
   wherein the step of processing the acquired 3D pulmonary CT sequence images further comprises the steps of:
   the acquired 3D pulmonary CT sequence images comprises a plurality of slices of 2D images, using each slice of the plurality of slices of 2D images containing pulmonary nodules as a center slice, acquiring n slices of the plurality of slices of 2D images before and another n slices of the plurality of slices of 2D images after the center slice, using the center slice, the n slices of the plurality of slices of 2D images before the center slice, and the another n slices of the plurality of slices of 2D images after the center slice together as the 2D image data, wherein n is an integer greater than or equal to 1;
   wherein the preset deep learning network model comprises multi-scale features, and the multi-scale features are applied in the training of the preset deep learning network model; the multi-scale features are constructed by fusing a response information of different layers of the preset deep learning network model.

2. The CT pulmonary nodule detection method based on deep learning according to claim 1, further comprises the step of before the step of inputting the set of 3D pulmonary CT sequence images to be tested, using each slice of the set of 3D pulmonary CT sequence images to be tested containing pulmonary nodules as a center slice, acquiring n slices before and another n slices after the center slice, using the center slice, the n slices of the set of 3D pulmonary CT sequence images to be tested before the center slice, and the another n slices of the set of 3D pulmonary CT sequence images to be tested after the center slice together as a 2D image data of the set of 3D pulmonary CT sequence images to be tested, where n is an integer greater than or equal to 1.

3. The CT pulmonary nodule detection method based on deep learning according to claim 1, wherein the step of applying a pulmonary region segmentation algorithm further comprises,
   according to a preset pulmonary region segmentation model, segmenting the preliminary pulmonary nodule detection result to remove false positive pulmonary nodules.

4. The CT pulmonary nodule detection method based on deep learning according to claim 3, wherein,
   the preset deep learning network model is constructed and trained with the 2D image data to obtain the preset pulmonary region segmentation model.

5. A non-transitory computer-readable medium having stored thereon computer-executable instructions configured to cause a processor to perform the method of claim 1.

6. A computed tomography (CT) pulmonary nodule detection apparatus based on deep learning, which comprises a processor having the following modules:
   an acquiring module configured for acquiring three dimensional (3D) pulmonary CT sequence images of a user;
   a transforming module configured for processing the acquired 3D pulmonary CT sequence images into multiple two dimensional (2D) image data;
   a training module configured for inputting the multiple 2D image data into a preset 2D deep learning network model for training, thus obtaining a trained pulmonary nodule detection model;
   a testing module configured for inputting a set of 3D pulmonary CT sequence images to be tested into the trained pulmonary nodule detection model to obtain a preliminary pulmonary nodule detection result;
   an outputting module configured for applying a pulmonary region segmentation algorithm based on deep learning to the preliminary pulmonary nodule detection result to remove false positive pulmonary nodules, thus obtaining a final pulmonary nodule detection result;
   wherein the transforming module further comprises:
   the acquired 3D pulmonary CT sequence images comprises a plurality of slices of 2D images, using each slice of the plurality of slices of 2D images containing pulmonary nodules as a center slice, acquiring n slices of the plurality of slices of 2D images before and another n slices of the plurality of slices of 2D images after the center slice, using the center slice, the n slices of the plurality of slices of 2D images before the center slice, and the another n slices of the plurality of slices of 2D images after the center slice together as the 2D image data, wherein n is an integer greater than or equal to 1;
   wherein in training module, the preset deep learning network model comprises multi-scale features, and the multi-scale features are applied in the training of the preset deep learning network model; the multi-scale features are constructed by fusing a response information of different layers of the preset deep learning network model.

7. The CT pulmonary nodule detection apparatus based on deep learning according to claim 6, wherein, before inputting the set of 3D pulmonary CT sequence images to be tested, the testing module is configured for using each slice of the set of 3D pulmonary CT sequence images to be tested containing pulmonary nodules as a center slice, acquiring n slices before and another n slices after the center slice, using the center slice, the n slices of the set of 3D pulmonary CT sequence images to be tested before the center slice, and the another n slices of the set of 3D pulmonary CT sequence images to be tested after the center slice together as a 2D image data of the set of 3D pulmonary CT sequence images to be tested, where n is an integer greater than or equal to 1.

8. The CT pulmonary nodule detection apparatus based on deep learning according to claim 6, wherein, according to a preset pulmonary region segmentation model, the outputting module is configured for segmenting the preliminary pulmonary nodule detection result to remove false positive pulmonary nodules.

9. The CT pulmonary nodule detection apparatus based on deep learning according to claim 8, wherein the preset deep learning network model is configured to be constructed and trained with the 2D image data to obtain the preset pulmonary region segmentation model.

\* \* \* \* \*